United States Patent
Jia et al.

(10) Patent No.: US 11,386,669 B2
(45) Date of Patent: Jul. 12, 2022

(54) BUILDING EVACUATION METHOD AND BUILDING EVACUATION SYSTEM

(71) Applicant: CARRIER CORPORATION, Palm Beach Gardens, FL (US)

(72) Inventors: Zhen Jia, Shanghai (CN); Yun Li, Shanghai (CN); Jialong Wang, Shanghai (CN); Guicai Zhang, Shanghai (CN); Qiang Chen, Shanghai (CN); Haitao Zhou, Shanghai (CN); Xiaowu Li, Shanghai (CN); Chao Wang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/251,515

(22) PCT Filed: Aug. 2, 2019

(86) PCT No.: PCT/US2019/044801
§ 371 (c)(1),
(2) Date: Dec. 11, 2020

(87) PCT Pub. No.: WO2020/033244
PCT Pub. Date: Feb. 13, 2020

(65) Prior Publication Data
US 2021/0248384 A1    Aug. 12, 2021

(30) Foreign Application Priority Data

Aug. 6, 2018  (CN) .......................... 201810884144.6

(51) Int. Cl.
*G06T 7/70*       (2017.01)
*G06V 20/52*   (2022.01)
(Continued)

(52) U.S. Cl.
CPC .............. *G06V 20/53* (2022.01); *G06T 7/292* (2017.01); *G06V 40/20* (2022.01); *G06T 2207/30196* (2013.01)

(58) Field of Classification Search
CPC ................ G06T 7/80; G06T 7/70; B60R 1/02
See application file for complete search history.

(56) References Cited

U.S. PATENT DOCUMENTS 7,140,469 B2    11/2006  Deplazes et al.
9,654,908 B2     5/2017  Schoner et al.
(Continued)

FOREIGN PATENT DOCUMENTS

CA    2987507 A1    2/2017
CN    102509410 B   8/2013
(Continued)

OTHER PUBLICATIONS

Alqaysi, Hiba H., et al. "Detection of Abnormal behavior in Dynamic Crowded Gatherings", 2013 IEEE Applied Imagery Pattern Recognition Workshop, 6 pages.
(Continued)

*Primary Examiner* — Myron Wyche
(74) *Attorney, Agent, or Firm* — Cantor Colburn LLP

(57) ABSTRACT

The present disclosure discloses a building evacuation system and a building evacuation method. The evacuation method comprises: capturing image data of a region by a plurality of sensors to track a moving state of people in the region; detecting, in the moving state of the people being tracked, an object specified by at least one set abnormal mode, and matching the object with the abnormal mode; and generating an indication representing an abnormality of evacuation behavior based on the abnormal mode after being matched. The present disclosure can provide efficient evacuation.

14 Claims, 3 Drawing Sheets

(51) Int. Cl.
*G06T 7/292* (2017.01)
*G06V 40/20* (2022.01)

(56) References Cited

U.S. PATENT DOCUMENTS

| | | |
|---|---|---|
| 2011/0112660 A1 | 5/2011 | Bergmann et al. |
| 2012/0047083 A1 | 2/2012 | Qiao et al. |
| 2014/0313330 A1 | 10/2014 | Carey |
| 2016/0259980 A1 | 9/2016 | Mlybari et al. |
| 2016/0289042 A1 | 10/2016 | Fang et al. |
| 2016/0289044 A1 | 10/2016 | Hsu et al. |
| 2016/0292515 A1 | 10/2016 | Jia et al. |
| 2016/0292522 A1 | 10/2016 | Chen et al. |
| 2016/0368732 A1 | 12/2016 | Zhao et al. |
| 2017/0103491 A1 | 4/2017 | Bora |
| 2017/0345265 A1* | 11/2017 | Zhao .................. G08B 7/066 |
| 2017/0369275 A1 | 12/2017 | Saraswat et al. |
| 2018/0109933 A1 | 4/2018 | Balthasar |

FOREIGN PATENT DOCUMENTS

| | | |
|---|---|---|
| EP | 2736027 B1 | 5/2018 |
| WO | 2016112859 A1 | 7/2016 |
| WO | 2017009649 A1 | 1/2017 |

OTHER PUBLICATIONS

Elbadramany, Iman K., "Towards Calibration of Optical Flow of Crowd Videos Using Observed Trajectories", University of Central Florida, STARS, 2011, 120 pages.
International Search Report and Written Opinion for application PCT/US2019/044801, dated Oct. 14, 2019, 15 pages.
Liu, Shuaicheg et al., "Video Stabilization with a Depth Camera", availabe at: http://www.liushuaicheng.org/CVPR2012/index.html, accessed Mar. 11, 2021,7 pages.
Lladrovci, Mimoze, "Indoor navigation with motion tracking and depth perception sensors", Jan. 6, 2016, Norwegian University of Science and Technology, 64 pages.
Szczodra, Maciej, et al., "Behavior Analysis and Dynamic Crowd Management in Video Surveilance System", Database and Expert Systems Applications, 2011, 5 pages.

* cited by examiner

BUILDING EVACUATION METHOD AND BUILDING EVACUATION SYSTEM

CROSS-REFERENCE TO RELATED APPLICATIONS

This application is a National Phase of PCT Application No. PCT/US2019/044801 filed Aug. 2, 2019 which claims the benefit of priority to Chinese Application No. 201810884144.6 filed Aug. 6, 2018, the disclosure of which is incorporated herein by reference in its entirety.

FIELD OF THE DISCLOSURE

The present disclosure relates to building evacuation in emergencies, and in particular, to a building evacuation method and a building evacuation system.

BACKGROUND OF THE DISCLOSURE

In the event of an emergency, how to effectively evacuate people in buildings, especially in high-rise or super high-rise buildings, is a major issue in current social security work. During evacuation, it is important to accurately acquire locations of people, track them and know where a people flow flows in real time. Once the tracked people flow is found to have an abnormal behavior, reasonable measures may be taken in time to speed up the evacuation process based on the information that has been known.

SUMMARY OF THE DISCLOSURE

One technical problem to be solved by the present disclosure is to provide an evacuation method that is capable of detecting an abnormality in an evacuation process inside a building, the method including:

1) capturing image data of a region by a plurality of sensors to track a moving state of people in the region;

2) detecting, in the moving state of the people being tracked, an object specified by at least one set abnormal mode, and matching the object with the abnormal mode; and 3) generating an indication representing an abnormality of evacuation behavior based on the abnormal mode after being matched.

In the evacuation method described above, the sensors being 2D or 3D imaging sensors, or depth sensors.

In the evacuation method described above, arranging the plurality of sensors in the region at positions of different viewing angles such that between the plurality of sensors, there are continuous fields of view that are adjacent to each other or partially overlapped with each other.

In the evacuation method described above, the object includes at least one of the following parameters: a moving speed of a people flow, a moving acceleration of a people flow, a moving direction of a people flow, a density of a people flow, a length of a people flow, a height of a people flow, an area of a people flow, a volume of a people flow, the number of people, a moving speed of an individual, a moving acceleration of an individual, a moving direction of an individual, a height of an individual, a volume of an individual, and a position of an individual.

In the evacuation method described above, the abnormal mode includes any one of the following situations or a combination thereof:

1) a people flow is crowded;
2) a moving direction is wrong;
3) a moving speed is too fast, too slow, or a movement stops.

In the evacuation method described above, the abnormal mode is predefined, or defined according to real-time conditions of the building.

In the evacuation method described above, the object specified by the abnormal mode is detected in a global coordinate system, wherein the image data is converted from a sensor coordinate system to the global coordinate system through sensor calibration.

In another aspect, the present disclosure relates to a building evacuation system, including:

a processing unit configured to process image data in a region captured by a plurality of sensors to track a moving state of people in the region;

a matching unit configured to match an object specified by at least one abnormal mode and detected in the moving state of the people with the abnormal mode; and a responding unit configured to generate an indication representing an abnormality of evacuation behavior based on the abnormal mode after being matched.

The above evacuation system further includes an abnormal mode defining unit configured to define the abnormal mode, which includes any one of the following situations or a combination thereof:

1) a people flow is crowded;
2) a moving direction is wrong;
3) a moving speed is too fast, too slow, or a movement stops.

The evacuation system described above further includes a calibrating unit configured to convert the image data from a sensor coordinate system to a global coordinate system such that the object specified by the abnormal mode is detected in the global coordinate system.

Further another aspect of the present disclosure is to provide a controller comprising a memory and a processor, wherein programs are stored in the memory, and when the programs are executed by the processor, the method according to any one of the above is implemented.

In still another aspect of the present disclosure, a building evacuation system is provided, which comprises:

a data capture module comprising a plurality of sensors;
a control module comprising the controller described above; and
a terminal module configured to receive an indication from the controller which represents an abnormality of evacuation behavior and has a device for reflecting the indication.

The present disclosure can reflect the real-time situation in the monitored region from omni-directions, track a trajectory of pedestrians in the region, and acquire accurate information of abnormality of a people flow, thereby taking pertinent measures to help the evacuation of people.

The present disclosure uses a multi-angle pedestrian tracking technology to implement a smart evacuation solution. Positions of people and information of a people flow can be obtained in the evacuation process by tracking people with continuous monitoring and using sensors. Based on the information, better evacuation measures can be taken to increase evacuation speed and efficiency, and personal security is ensured. The present disclosure can contribute to development of intelligent building operation application technology.

Other aspects and features of the present disclosure will become apparent from the following detailed description with reference to the drawings. It should be understood, however, that the drawings are intended for purposes of illustration only, rather than defining the scope of the present disclosure, which should be determined with reference to the appended claims. It should also be understood that the drawings are merely intended to conceptually illustrate the structure and flowchart described herein, and it is not necessary to draw the figures to the scale, unless otherwise specified.

BRIEF DESCRIPTION OF THE DRAWINGS

The present disclosure will be more fully understood from the following detailed description of specific embodiments with reference to the drawings.

DETAILED DESCRIPTION OF THE EMBODIMENT(S) OF THE DISCLOSURE

To help those skilled in the art precisely understand the subject matter of the present disclosure, specific embodiments of the present disclosure are described in detail below with reference to the accompanying drawings.

Figure 1:
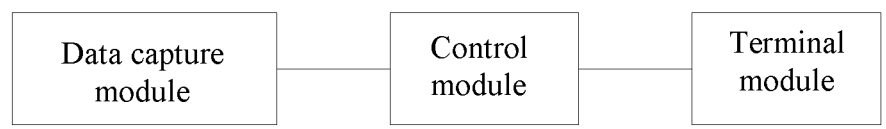
FIG. 1 is a schematic diagram of an evacuation system according to the present disclosure.

The evacuation method and the evacuation system referred to in the present disclosure are applied to emergency evacuation of people in a building. The building includes, but is not limited to, high-rise buildings, large buildings, public facilities and sites, and indoor spaces where people are active (either open regions or closed regions). The present disclosure can monitor evacuation of people from the building and can timely detect an abnormality in the evacuation process, and then report it to building management personnel to take pertinent measures. As shown in FIG. 1, the system at least comprises a data capture module, a control module, and a terminal module. The data capture module comprises a plurality of sensors for acquiring image data, and transmits the image data to the control module for data calculation, analysis, and judgment. Subsequently, the control module sends an indication representing a result of the data processing to the terminal module, and the management personnel can know about the emergency situation occurring in the building through the terminal module.

Figure 2:
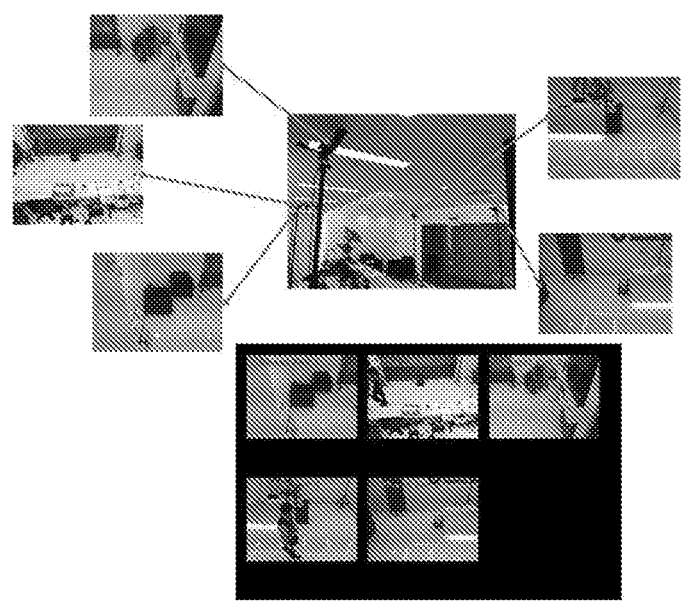
FIG. 2 illustrates an embodiment of sensor arrangement and acquisition in an evacuation method according to the present disclosure.

A plurality of sensors capture image data about conditions inside the building and/or movement of people. The sensors comprises a 2D or 3D imaging sensor or a depth sensor, including but not being limited to a 2D imaging sensor, a 3D imaging sensor, various depth sensors, and the like. The plurality of sensors have adjacent and continuous fields of view or continuous fields of view that are spatially overlapped with each other partially. For a relatively large region, the field of view of one sensor is limited, which cannot cover the entire region. Therefore, a plurality of sensors are arranged at positions of a plurality of viewing angles. FIG. 2 shows an arrangement of sensors in a room, in which five sensors are arranged in the same region and around the region, forming a circle. Between two adjacent sensors, there is a sensing range in a continuous space with adjacent fields of view or partially overlapped fields of view, so that the image data in the region can be obtained completely in all directions. The imaging sensor can be a conventional camera. Depth sensor technologies and devices include, but are not limited to, structured light measurements, phase shift measurements, time-of-flight measurements, stereo triangulation devices, optical triangulation plates, light field cameras, coded aperture cameras, computational imaging techniques, simultaneous localization and mapping (SLAM), imaging radar, imaging sonar, scanning LIDAR (Light Detection and Ranging), flash LIDAR, passive infrared (PIR) sensor, and compact focal plane array (FPA) or a combination including at least one of the foregoing. Different technologies may include active (both transmitting and receiving signals) technologies or passive (receiving signals only) technologies, and may be operated at the band of electromagnetic or acoustic spectrum (such as vision, infrared, etc.).

The sensors perform scanning or shooting at a certain rate to obtain a plurality of image data reflecting the condition of the region, wherein the condition of the region includes individuals, a people flow and/or background that are visible in the region. The image data captured by a general imaging sensor is picture data, and the image data captured by the depth sensor is depth image data. These image data are sent to the control module for processing. The control module has a controller for performing the evacuation method according to the present disclosure. The controller includes a memory in which programs are stored, and a processor, and the evacuation method can be implemented when the programs are executed by the processor.

Figure 3:
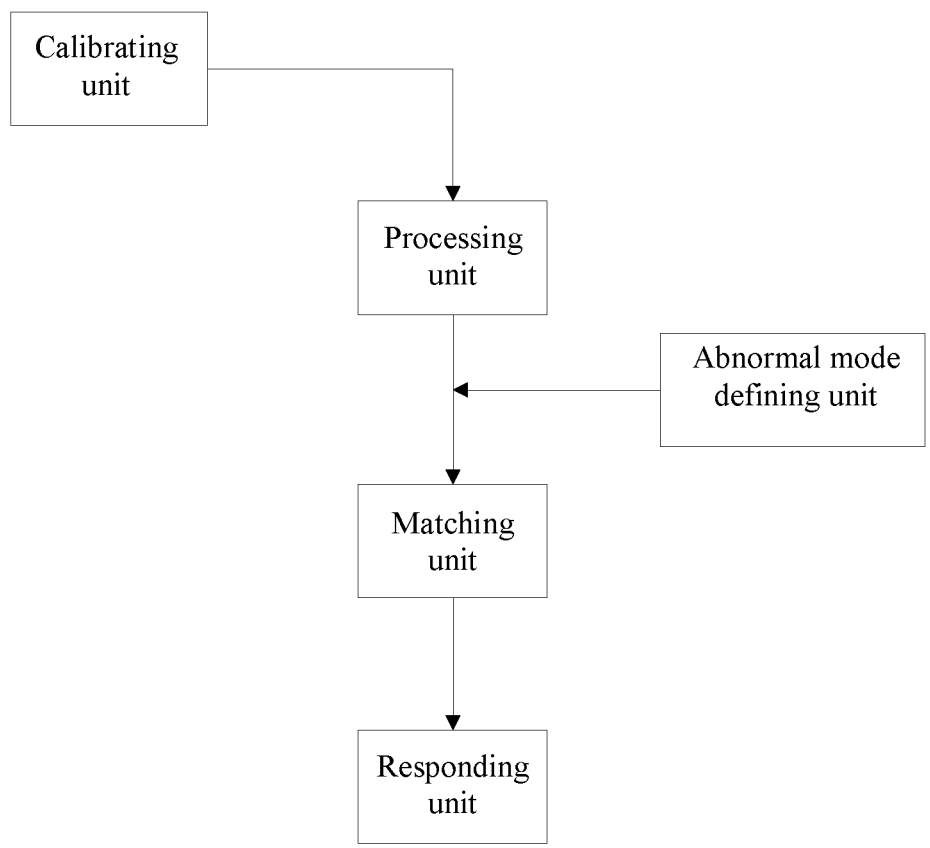
FIG. 3 is a schematic diagram of a control module in an evacuation system according to the present disclosure.

Referring to FIG. 3, the controller at least comprises a calibrating unit, a processing unit, an abnormal mode defining unit, a matching unit, and a responding unit.

The calibrating unit is configured to perform sensor calibration, data related to the condition of the region is recorded into the sensor coordinate system by establishing a mathematical relationship, and the sensor coordinate data is mapped into a global coordinate transformation matrix. The sensors may not have the same sensor coordinate system, and associated data in different coordinate systems can be converted through a transformation matrix into a consistent coordinate system. The evacuation system of the present disclosure uses a transformation matrix to obtain the position of a tracked target or a specified stationary target in the global coordinate system, thereby performing subsequent data calculation, detection, processing, and the like in the global coordinate system. The calibrating unit can be a separate unit or a part of a processing unit described below.

The processing unit is configured to recognize intention of a moving target and predict behavior of the target, based on the global coordinate system, thereby achieving the purpose of tracking. The tracking can be deemed as the issue of probability of a particular system state, given a previous system state, observations, and uncertainty. Recognizing the moving target includes, but is not limited to, whether the target is approaching, leaving, or passing through a location. The image data, after being processed, can provide a plurality of physical quantities related to target movement in the global coordinate system, including but not being limited to position, speed, acceleration, moving direction, a distance from a specified background, and the like. The tracking process consists of two steps, i.e., predicting and updating. By establishing a model, the target state in the previous image data is forwarded to the current image data for prediction. In the updating step, the target in the current image data is detected, and the detected target is associated with the predicted target, so that the real-time condition of the target can be obtained.

The abnormal mode defining unit is set to define a situation in which target behavior is abnormal. A plurality of abnormal modes can be set. The definition of the abnormal mode can be predefined, for example, it can be set artificially or by making reference to empirical values, or according to the real-time condition of the system. Each abnormal mode is provided with a threshold or condition. The same abnormal mode can also have multiple possibilities for threshold settings and conditional requirements. Thresholds and conditions can be pre-adjusted to meet various abnormal mode situations or can be verified manually. The threshold refers to a physical quantity with respect to the target movement, including a numerical value and/or a numerical range, which may be static or dynamic. The condition may be a state in which a plurality of threshold values are combined or a state in which a threshold value and a non-threshold value are combined, for example, reference is also made to other information having nothing to do with the moving object but being related to the physical environment in the region or related to the region layout, e.g., temperature in the region, air quality, and such information as whether other sensors or alarm devices in the region are working normally. When the evacuation system of the present disclosure is a part of a building security system, the abnormal mode defining module can also maintain communication with other systems in the security system to make mode definition more comprehensive and set thresholds and conditions corresponding to different modes. The abnormal mode defining unit may perform the mode definition at the beginning of the controller implementing the evacuation method, the thresholds and conditions corresponding to the mode may be reset, adjusted, and/or may accept manual setting, check or correction, and the thresholds and conditions may remain unchanged in the process of implementation or may be updated as required in the process of implementation, or new thresholds and conditions that can accept manual setting, check or correction may be generated. The abnormal mode defining unit can be a separate unit or a part of another unit (such as a processing unit or a matching unit).

The matching unit is configured to extract a corresponding data processing result from the processing unit based on a threshold or condition of each mode defined by the abnormal mode defining unit. The matching unit generates a plurality of detecting subunits, each of which includes a detection object specified by the corresponding abnormal mode, and the object includes the followings: moving speed of a people flow, moving acceleration of a people flow, moving direction of a people flow, density of a people flow, length of a people flow, height of a people flow, area of a people flow, volume of a people flow, number of pedestrians, moving speed of an individual, moving acceleration of an individual, moving direction of an individual, height of an individual, volume of an individual, position of an individual, etc. The processing unit provides a corresponding detection object to the detection subunit based on the tracking result. Due to the dynamic nature of the moving target, the processing unit needs to obtain the information of the detection object without interruption, so as to obtain the situation occurring in the building in real time. A timer can be provided in the processing unit to periodically update the detection object within the detection subunit. In addition, when the definition of the abnormal mode changes, the detection object specified changes correspondingly, and the matching unit also needs to immediately generate a new detection subunit to meet the requirements of the new abnormal mode. After obtaining the detection object, a comparing subunit may be provided, in which the detection object is compared and judged with the threshold and/or condition of the abnormal mode. The matching process is also repeated continuously, which can be operated based on a preset time period or a newly generated abnormal mode until the matching is successful. At this point, the system will consider that there may be abnormal evacuation behavior in the region. After confirmation, the system will generate a diagnostic result for execution of the next step. The matching unit maintains connection with the processing unit and the abnormal mode defining unit. The matching unit sends a request for extracting the detection object to the processing unit, and the processing unit transmits corresponding data information to the matching unit. The detection object and the matching requirement determined by the matching unit are customized based on the mode of the abnormal mode unit, and meanwhile the definition criteria of the abnormal mode defining unit can also be adjusted with reference to the data of the matching unit.

The responding unit is configured to generate an indication representing an abnormality of the evacuation behavior, based on the diagnostic result. The indication may be generated as a single indication, or multiple indications reflecting a specific evacuation behavior, or multiple indications corresponding to the type of the abnormal mode, or may be converted into a system certified output. This indication can be reported directly to the people and/or machine and is identifiable. The indication can be a readable, visible, audible alarm signal, so that the building management personnel can take an active and effective countermeasure after receiving of the signal; the indication can also be input into a central controller of the system, and the central controller makes response to generate a new command to control and coordinate operation of the various facilities inside the building; this indication may also be a combination of the above two indications.

The indication representing an abnormality of the evacuation behavior is sent to the terminal module of the evacuation system for display thereon. The terminal module may be an output part of an evacuation system or a central system of the building, including but not being limited to a central console, a display having a human-machine interaction device, an alarm, etc., or may be a mobile terminal or the like that wirelessly communicates with the aforementioned controller. It can be reported to the operator of the terminal module in the form of image data originally acquired by the sensors, processed image data, or other easily understandable characters, images, audio and video after conversion.

Figure 4:
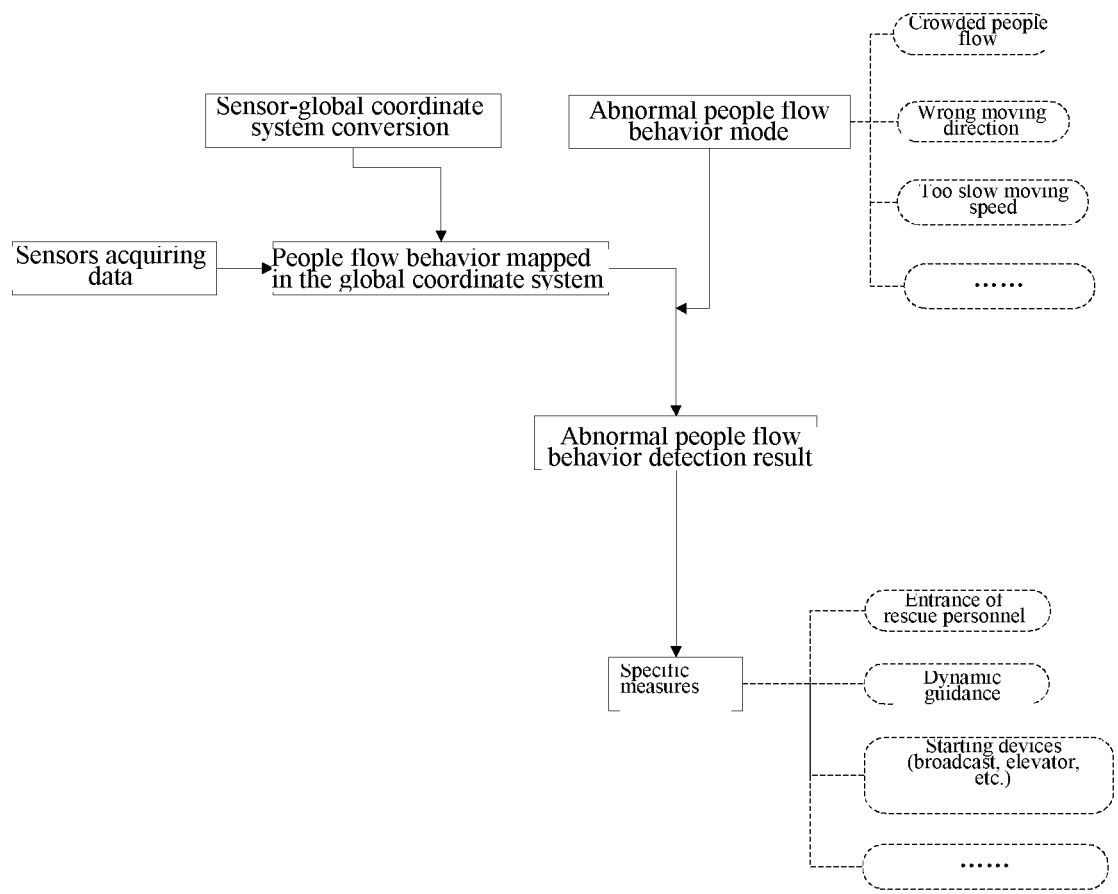
FIG. 4 is an embodiment of an evacuation method according to the present disclosure.

The evacuation method according to the present disclosure will be described below with reference to FIG. 4 using an example of a fire in a building.

A plurality of sensors are activated to acquire image data of the same region, such as an aisle. The fields of view between the plurality of sensors constitute a continuous field of view that reflects the panorama in the region. The sensors transmit the image data to the control module to track movement of a people flow in the aisle. Through sensor calibration, the image data is converted from a sensor coordinate system to a global coordinate system, and is processed to obtain speed, direction and density of the people flow.

The abnormal mode is defined as three modes. The first mode relates to a situation in which the people flow in the aisle is overcrowded. In this case, the people flow is slow and density thereof is too high. The second mode is that a moving direction of the people flow is wrong. The third mode is that a moving speed of the people flow is too slow. Data of speed and density of a people flow is extracted according to the first mode, data of direction of a people flow is extracted according to the second mod, data of speed of a people flow is extracted according to the third mode, and these detection objects are respectively compared with the threshold or condition of the abnormal mode that has been set. If they match, the corresponding abnormal mode is confirmed, and then the control module sends the matching result to the terminal module. The set thresholds or conditions corresponding to the respective abnormal modes are pre-adjustable to meet different situations while being able to accept check and verification by system operators such as building management personnel. Corresponding measures can be taken to deal with different abnormal modes. For the first mode in which the people flow is crowded, firefighters can be sent to the relevant locations in the building for evacuation; for the second mode in which moving direction of people flow is wrong, the moving direction of the people flow can be corrected by broadcasting evacuation or starting dynamic guidance system of the building; and for the third mode in which speed of the people flow is too slow, firefighters can be sent into the building for rescue upon consideration of life danger.

The three modes are not limited to the data objects specified above. For example, for the first mode, crowded people flow are largely caused by people falling down, or people with mobility problems affect the speed of evacuation, or there is collision of people flows. Accordingly, for the first mode, the matching unit can be arranged to detect height of a people flow or combine with moving direction of the people flow or moving direction of an individual. For another example, for the second mode, if the moving directions of people flows are completely opposite, it is possible that what is acquired is the image data of firefighters, and thus a step of identifying moving pedestrians can be added. For further another example, a too fast speed of the people flow or even a speed of zero is also an abnormal evacuation behavior, and this detection object can be added to the definition of the third mode, which can also be taken as a fourth abnormal mode (speed of the people flow is too fast) and a fifth abnormal mode (speed of the people flow is zero) for detection.

In addition to detecting the data related to the people flow, it is also possible to detect data related to movement of an individual or to match the combined data of people flow and individual with the abnormal mode.

The terminal module may be a screen in a central monitoring room of the building, and may be output in various forms such as direct pictures or maps to notify the management personnel of the evacuation behavior in which region is abnormal. Firefighters can also hold a portable terminal module, such as a PDA with real-time display and intercom function, which is in direct communication with the control module of the evacuation system or wirelessly connected to a console of the central monitoring room of the building. Firefighters can keep abreast of the rescue situation in the building.

In terms of countermeasures, there may be other pertinent measures without being limited to those as aforementioned. For example, when it is found through detection of height of the people flow in the image data that there are pedestrians moving with wheelchairs in the evacuated crowd, an elevator can be temporarily activated.

Principles of the present disclosure are described in connection with the specific embodiments of the present disclosure that have been shown and described in detail, but it should be understood that the present disclosure can be implemented in other ways without departing from the principles.

What is claimed is:

1. A building evacuation method, comprising:
   1) arranging a plurality of the sensors in a region at positions of different viewing angles such that between the plurality of the sensors, there are continuous fields of view that are adjacent to each other and partially overlapped with each other;
   2) capturing image data of a region by the plurality of sensors to track a moving state of people in the region;
   3) detecting, in the moving state of the people being tracked, an object specified by at least one set abnormal mode, and matching the object with the abnormal mode; and
   4) generating an indication representing an abnormality of evacuation behavior based on the abnormal mode after being matched.

2. The method according to claim 1, wherein the sensors being 3D imaging sensors or depth sensors.

3. The method according to claim 1, wherein the object comprises at least one of the following parameters: a moving speed of a people flow, a moving acceleration of a people flow, a moving direction of a people flow, a density of a people flow, a length of a people flow, a height of a people flow, an area of a people flow, a volume of a people flow, the number of people, a moving speed of an individual, a moving acceleration of an individual, a moving direction of an individual, a height of an individual, a volume of an individual, and a position of an individual.

4. The method according to claim 1, wherein the abnormal mode comprises any one of the following situations or a combination thereof:
   1) a people flow is crowded;
   2) a moving direction is wrong;
   3) a moving speed is too fast, too slow, or a movement stops.

5. The method according to claim 1, wherein the abnormal mode is predefined, or defined according to real-time conditions of the building.

6. The method according to claim 1, wherein the object specified by the abnormal mode is detected in a global coordinate system, and wherein the image data is converted from a sensor coordinate system to the global coordinate system through sensor calibration.

7. A building evacuation system, comprising:
   a plurality of the sensors are arranged in a region at positions of different viewing angles such that between the plurality of the sensors, there are continuous fields of view that are adjacent to each other and partially overlapped with each other;
   a processing unit configured to process image data of the region captured by a the plurality of sensors to track a moving state of people in the region;
   a matching unit configured to match an object specified by at least one abnormal mode and detected in the moving state of the people with the abnormal mode; and
   a responding unit configured to generate an indication representing an abnormality of evacuation behavior based on the abnormal mode after being matched.

8. The evacuation system according to claim 7, wherein the sensors being 3D imaging sensors or depth sensors.

9. The evacuation system according to claim 7, wherein the object comprises at least one of the following parameters: a moving speed of a people flow, a moving acceleration of a people flow, a moving direction of a people flow, a density of a people flow, a length of a people flow, a height of a people flow, an area of a people flow, a volume of a people flow, the number of people, a moving speed of an individual, a moving acceleration of an individual, a moving direction of an individual, a height of an individual, a volume of an individual, and a position of an individual.

10. The evacuation system according to claim 7, further comprising an abnormal mode defining unit configured to define the abnormal mode, the abnormal mode defining unit comprising any one of the following situations or a combination thereof:
1) a people flow is crowded;
2) a moving direction is wrong;
3) a moving speed is too fast, too slow, or a movement stops.

11. The evacuation system according to claim 10, wherein the abnormal mode defining module is configured to predefine the abnormal mode or define the abnormal mode according to real-time conditions of the building.

12. The evacuation system according to claim 7, further comprising a calibrating unit configured to convert the image data from a sensor coordinate system to a global coordinate system such that the object specified by the abnormal mode is detected in the global coordinate system.

13. A controller, comprising a memory and a processor, wherein programs are stored in the memory, and when the programs are executed by the processor, the method according to claim 1 is implemented.

14. A building evacuation system, comprising:
a data capture module comprising a plurality of sensors;
a control module comprising the controller according to claim 13; and
a terminal module configured to receive an indication from the controller which represents an abnormality of evacuation behavior and has a device for reflecting the indication.

* * * * *